J. R. NEWTON.
PLOW.

No. 183,199. Patented Oct. 10, 1876.

WITNESSES:

INVENTOR:
J. R. Newton
BY
ATTORNEYS.

JAMES R. OSGOOD & CO BOSTON

UNITED STATES PATENT OFFICE.

JOHN R. NEWTON, OF RUSK, TEXAS.

IMPROVEMENT IN PLOWS.

Specification forming part of Letters Patent No. 183,199, dated October 10, 1876; application filed June 12, 1876.

*To all whom it may concern:*

Figure 1:
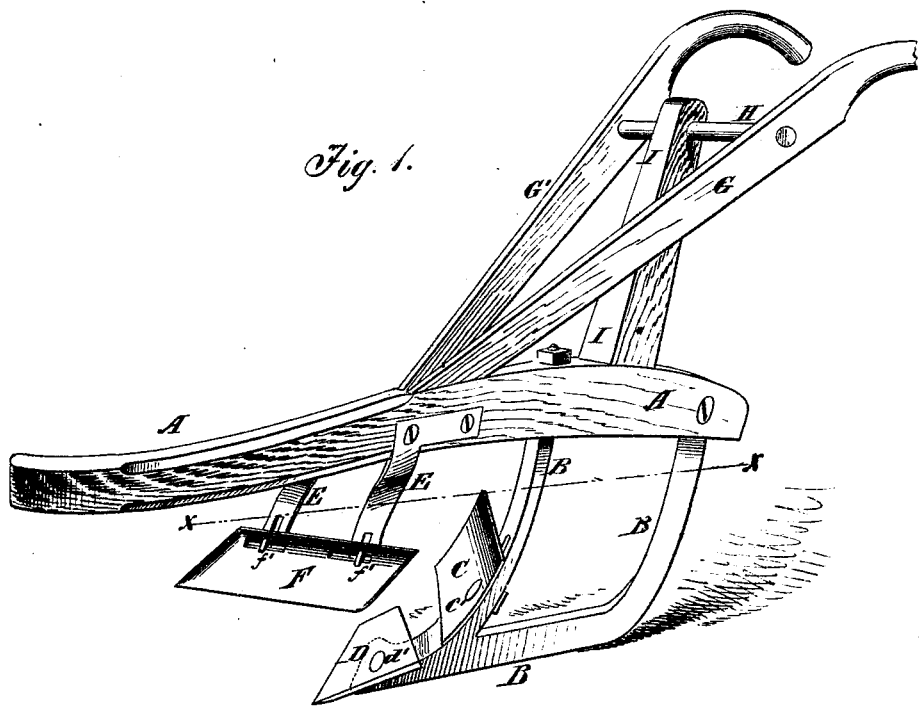
Figure 2:
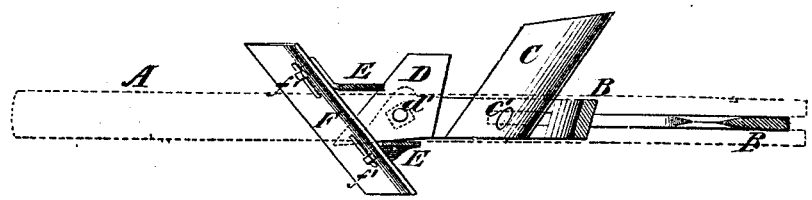

Be it known that I, JOHN R. NEWTON, of Rusk, in the county of Cherokee and State of Texas, have invented a new and useful Improvement in Plows, of which the following is a specification:

Figure 1 is a perspective view of my improved plow. Fig. 2 is a horizontal section of the same, taken through the line $x\ x$, Fig. 1.

Similar letters of reference indicate corresponding parts.

The object of this invention is to furnish an improved plow, which shall be so constructed that it may be readily adjusted for use as a subsoil-plow, as a turning-plow, as a scraper and cultivator, and as a scraper, cultivator, and hiller, and which shall be simple in construction and effective in operation in either capacity.

The invention will first be described in connection with the drawing, and then pointed out in the claim.

A is the plow-beam, to the rear part of which are attached the upper ends of the double standard B. The rear part of the standard B is curved forward to meet the forward part and serve as a foot for the plow, and the forward part is curved forward to serve as a seat for the wing or mold-board C and the point D. The point D is secured in place by a bolt, $d'$. The mold-board or wing C is secured in place by a bolt, $c'$, which passes through a hole in the said wing C, and through a slot in the forward part of the double standard B, so that the wing C can be raised and lowered as may be desired.

To the opposite sides of the middle part of the beam A, and the one in advance of the other, are attached the two standards E, the upper ends of which are bent to the rearward to give them a firm bearing upon the said beam.

F is the scraper, which is secured to the standard E by the two bolts $f'$. The bolts $f'$ pass through horizontal slots in the scraper F, and through vertical slots in the standards E, so that the said scraper may be adjusted laterally and vertically, as may be desired.

G are the handles, the lower ends of which are secured to the middle part of the beam A. The rear ends of the handles G are held in the proper relative position by the round H, and are supported at the proper height by the upright I, through the upper end of which the round H passes, and the lower end of which is secured to the rear part of the beam A.

By this construction, by removing the scraper F and the mold-board C, the plow can be used as a subsoiler. By removing the scraper F, the plow can be used as a turning-plow for breaking up land, throwing up beds, &c. By removing the mold-board C, the plow can be used as a scraper and cultivator. When all three parts are attached, the plow will scrape, cultivate, and hill the plants.

Having thus described my invention, I claim as new and desire to secure by Letters Patent—

The combination of wing C, point D, and scraper F, combined and arranged on a plow-frame, to operate together as set forth.

JOHN RILY NEWTON.

Witnesses:
R. H. GUINN,
E. L. GREGG.